United States Patent [19]
Duggan et al.

[11] Patent Number: 5,413,807
[45] Date of Patent: May 9, 1995

[54] METHOD OF MANUFACTURING A DONOR ROLL

[75] Inventors: Michael J. Duggan; Ann M. Kazakos, both of Webster; Daniel R. Gilmore, III, Victor, all of N.Y.

[73] Assignee: Xerox Corporation, Stamford, Conn.

[21] Appl. No.: 324,046

[22] Filed: Oct. 17, 1994

[51] Int. Cl.⁶ .............................. B05D 5/12
[52] U.S. Cl. .................... 427/58; 427/261; 427/282; 427/402; 427/430.1
[58] Field of Search .............. 427/58, 261, 282, 402, 427/430.1

[56] References Cited

U.S. PATENT DOCUMENTS

| | | | |
|---|---|---|---|
| 3,880,609 | 4/1975 | Caddock | 29/620 |
| 3,996,892 | 12/1976 | Parker et al. | 118/658 |
| 4,697,335 | 10/1987 | Pedersen et al. | 29/620 |
| 4,868,600 | 9/1989 | Hays et al. | 355/259 |
| 5,073,840 | 12/1991 | Coors | 361/400 |
| 5,172,170 | 12/1992 | Hays et al. | 355/259 |
| 5,268,259 | 12/1993 | Sypula | 430/311 |
| 5,289,240 | 2/1994 | Wayman | 355/259 |

Primary Examiner—Bernard Pianalto
Attorney, Agent, or Firm—John S. Wagley

[57] ABSTRACT

A method of manufacturing a donor roll having a plurality of electrodes on the surface of the roll is provided. The roll is for use in developing a latent image. The method includes providing a substantially cylindrical member and covering at least a portion of the surface of the member tangentially with a screen. The screen has an aperture therein. The method further includes urging a conductive material through at least a portion of the aperture and onto the surface of the member to form at least one of the electrodes and advancing the screen and the surface of the member synchronously to form subsequent electrodes.

10 Claims, 6 Drawing Sheets

FIG. 4A
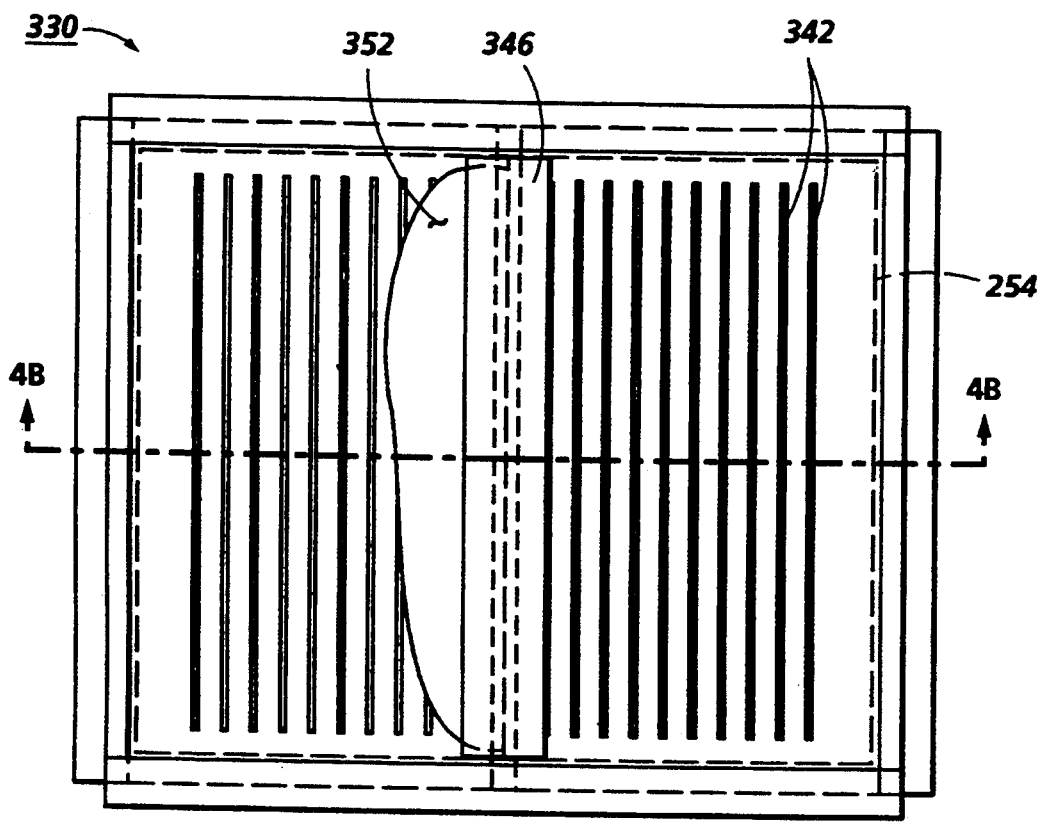
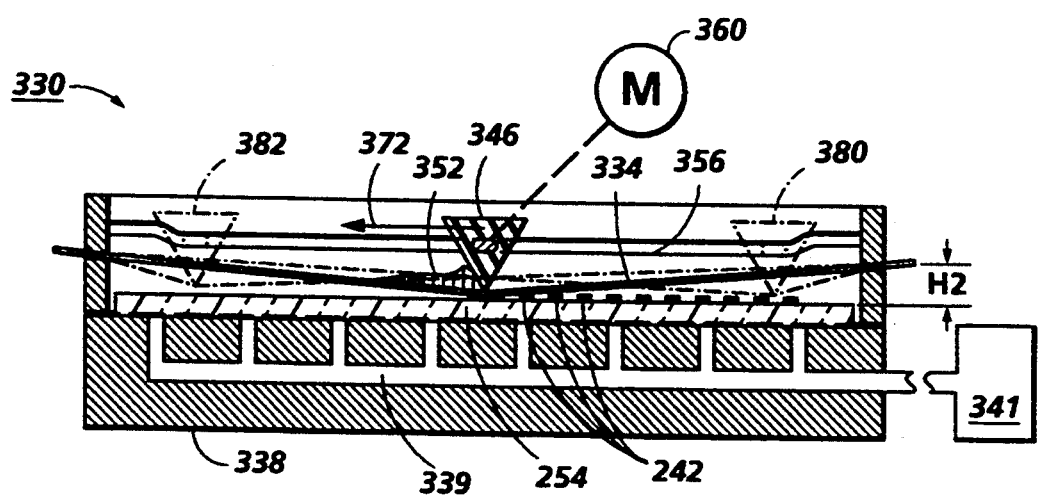
FIG. 4B

METHOD OF MANUFACTURING A DONOR ROLL

The present invention relates to a developer apparatus for electrophotographic printing. More specifically, the invention relates to a donor roll as part of a scavengeless development process.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

In the process of electrophotographic printing, the step of conveying toner to the latent image on the photoreceptor is known as "development." The object of effective development of a latent image on the photoreceptor is to convey toner particles to the latent image at a controlled rate so that the toner particles effectively adhere electrostatically to the charged areas on the latent image. A commonly used technique for development is the use of a two-component developer material, which comprises, in addition to the toner particles which are intended to adhere to the photoreceptor, a quantity of magnetic carrier beads. The toner particles adhere triboelectrically to the relatively large carrier beads, which are typically made of steel. When the developer material is placed in a magnetic field, the carrier beads with the toner particles thereon form what is known as a magnetic brush, wherein the carrier beads form relatively long chains which resemble the fibers of a brush. This magnetic brush is typically created by means of a "developer roll." The developer roll is typically in the form of a cylindrical sleeve rotating around a fixed assembly of permanent magnets. The carrier beads form chains extending from the surface of the developer roll, and the toner particles are electrostatically attracted to the chains of carrier beads. When the magnetic brush is introduced into a development zone adjacent the electrostatic latent image on a photoreceptor, the electrostatic charge on the photoreceptor will cause the toner particles to be pulled off the carrier beads and onto the photoreceptor. Another known development technique involves a single-component developer, that is, a developer which consists entirely of toner. In a common type of single-component system, each toner particle has both an electrostatic charge (to enable the particles to adhere to the photoreceptor) and magnetic properties (to allow the particles to be magnetically conveyed to the photoreceptor). Instead of using magnetic carrier beads to form a magnetic brush, the magnetized toner particles are caused to adhere directly to a developer roll. In the development zone adjacent the electrostatic latent image on a photoreceptor, the electrostatic charge on the photoreceptor will cause the toner particles to be attracted from the developer roll to the photoreceptor.

An important variation to the general principle of development is the concept of "scavengeless" development. The purpose and function of scavengeless development are described more fully in, for example, U.S. Pat. No. 4,868,600 to Hays et al. U.S. Pat. No. 4,868,600 to Hays et al., which is hereby incorporated by reference. In a scavengeless development system, toner is detached from the donor roll by applying AC electric field to self-spaced electrode structures, commonly in the form of wires positioned in the nip between a donor roll and photoreceptor. This forms a toner powder cloud in the nip and the latent image attracts toner from the powder cloud thereto. Because there is no physical contact between the development apparatus and the photoreceptor, scavengeless development is useful for devices in which different types of toner are supplied onto the same photoreceptor such as in "tri-level"; "recharge, expose and develop"; "highlight"; or "image on image" color xerography.

A typical "hybrid" scavengeless development apparatus includes, within a developer housing, a transport roll, a donor roll, and an electrode structure. The transport roll advances carrier and toner to a loading zone adjacent the donor roll. The transport roll is electrically biased relative to the donor roll, so that the toner is attracted from the carrier to the donor roll. The donor roll advances toner from the loading zone to the development zone adjacent the photoreceptor. In the development zone, i.e., the nip between the donor roll and the photoreceptor, are the wires forming the electrode structure. During development of the latent image on the photoreceptor, the electrode wires are AC-biased relative to the donor roll to detach toner therefrom so as to form a toner powder cloud in the gap between the donor roll and the photoreceptor. The latent image on the photoreceptor attracts toner particles from the powder cloud forming a toner powder image thereon.

Another variation on scavengeless development uses a single-component developer material. In a single component scavengeless development, the donor roll and the electrode structure create a toner powder cloud in the same manner as the above-described scavengeless development, but instead of using carrier and toner, only toner is used.

It has been found that for some toner materials, the tensioned electrically biased wires in self-spaced contact with the donor roll tend to vibrate which causes non-uniform solid area development. Furthermore, there is a possibility that debris can momentarily lodge on the wire to cause streaking. Thus, it would appear to be advantageous to replace the externally located electrode wires with electrodes integral to the donor roll.

In U.S. Pat. No. 5,172,170 to Hays et al., there is disclosed an apparatus for developing a latent image recorded on a surface, including a housing defining a chamber storing at least a supply of toner therein a moving donor member spaced from the surface and adapted to transport toner from the chamber of said housing to a development zone adjacent the surface, and an electrode member integral with the donor member and adapted to move therewith. The electrode member is electrically biased to detach toner from said donor member to form a cloud of toner in the space between the electrode member and the surface with toner developing the latent image. U.S. Pat. No. 5,172,170 is herein incorporated by reference.

While the use of electrodes integral to the donor roll have reduced the harmful effect of contamination and vibration in the development process, the prior art methods of manufacturing the donor member with integral electrodes have been been expensive. Prior methods have included spraying, dipping, powder spraying, photoresistive type etching and annular meniscus coating.

The following disclosures related to scavangeless and electroded rolls may be relevant to various aspects of the present invention:

U.S. Pat. No. 5,289,240 Patentee: Wayman Issue Date: Feb. 22, 1994

U.S. Pat. No. 5,268,259 Patentee: Sypula Issue Date: Dec. 7, 1993

U.S. Pat. No. 5,172,170 Patentee: Hays et al. Issue Date: Dec. 15, 1992

U.S. Pat. No. 4,868,600 Patentee: Hays et al. Issue Date: Sep. 19, 1989

U.S. Pat. No. 3,996,892 Patentee: Parker et al. Issue Date: Dec. 14, 1976

U.S. Pat. No. 5,289,240 discloses a donor roll which has two distinct set of electrodes along the periphery of the donor roll. The roll has a first set of electrodes that extend axially the length of the roll, are interconnected to each other and contact the filaments of a brush. The roll also has a second set of electrodes that extend axially the length of the roll, are interconnected to each other and do not contact the brush.

U.S. Pat. No. 5,268,259 discloses a process for preparing a toner donor roll which has an integral electrode pattern. The process includes coating a cylindrical insulating member with a photoresistive surface, pattern exposing the photoresistive surface to light to form an electrode pattern and depositing conductive metal on the portion of the member exposed to light to form the electrode pattern.

U.S. Pat. No. 5,172,170 discloses a donor roll with a plurality of electrical conductors spaced from one another with one of the conductors located in one of the grooves in the donor roll. A dielectric layer is disposed in at least the grooves of the roll interposed between the roll and the conductors and may cover the region between the grooves. The dielectric layer may be fabricated of anodized aluminum or a polymer and may be applied by spraying, dipping or powder spraying. The roll is made from a conductive material such as aluminum and the dielectric layer is disposed about the circumferential surface of the roll between adjacent grooves. The conductive material is applied to the grooves by a coater to form the electrical conductors. A charge relaxable layer is applied over the donor roll surface.

U.S. Pat. No. 4,868,600 discloses a scavengeless development system in which toner detachment from a donor and the concomitant generation of a controlled powder cloud is obtained by AC electrical fields supplied by self-spaced electrode structures positioned within the development nip. The electrode structure is placed in close proximity to the toned donor within the gap between toned donor and image receiver, self-spacing being effected via the toner on the donor.

U.S. Pat. No. 3,996,892 discloses a donor roll having an electrically insulative core made of a phenloic resin. The donor roll core is coated with conductive rubber doped with carbon black. Conductor strips are formed on the rubber by a copper cladding process followed by a photo-resist-type etching technique.

Various screen printing processes to deposit material on a substrate are known as illustrated by the following:

U.S. Pat. No. 5,073,840 Patentee: Coors Issue Date: Dec. 17, 1991

U.S. Pat. No. 4,697,335 Patentee: Pedersen et al. Issue Date: Oct. 6, 1987

U.S. Pat. No. 3,880,609 Patentee: Caddock Issue Date: Apr. 29, 1975

U.S. Pat. No. 5,073,840 discloses a circuit board including layers of dielectric and conductive material. Dielectric and conductive material are sequentially applied to a substrate using silk screening. Up to about twelve layers of dielectric material and electrically conductive material are separately applied and then each layer is dried and fired. Alternately all layers can be applied and then simultaneously fired. A copper based material is used and fired for one hour at 900° C. in a nitrogen atmosphere.

U.S. Pat. No. 4,697,335 discloses a circuit board including a base to which an electro-conductive coating material is applied as a liquid, paste or viscous mixture. A pattern is applied to an upper soluble layer of the base. After applying the pattern, the entire board is dried in an oven to approximately 200° F.

U.S. Pat. No. 3,880,609 discloses a silk screen apparatus for manufacturing a cylindrical resistor with a patterned previous portion matching the desired pattern on the resistor. A cylindrical substrate is placed beneath the screen and a resistive material is placed above the screen. The screen is moved beneath a squeegee which disperses and meters the resistive material onto the substrate. The cylindrical substrate is driven solely by the friction between the screen and the substrate.

SUMMARY OF THE INVENTION

According to the present invention, there is provided a method of manufacturing a donor roll having a plurality of electrodes on the surface of the roll. The roll is for use in developing a latent image. The method includes providing a substantially cylindrical member and covering at least a portion of the surface of the member tangentially with a screen. The screen has an aperture therein. The method further includes urging a conductive material through at least a portion of the aperture and onto the surface of the member to form at least one of the electrodes and advancing the screen and the surface of the member synchronously to form subsequent electrodes.

BRIEF DESCRIPTION OF THE DRAWINGS

FIG. 4A is a plan view of an alternate screen printing apparatus for manufacturing the screen printed donor roll of the present invention;

FIG. 4B is a sectional view along the line 4B—4B in the direction of the arrows of the screen printing apparatus of FIG. 4A;

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 3 printing machine will be shown hereinafter schematically and their operation described briefly with reference thereto.

Figure 2:
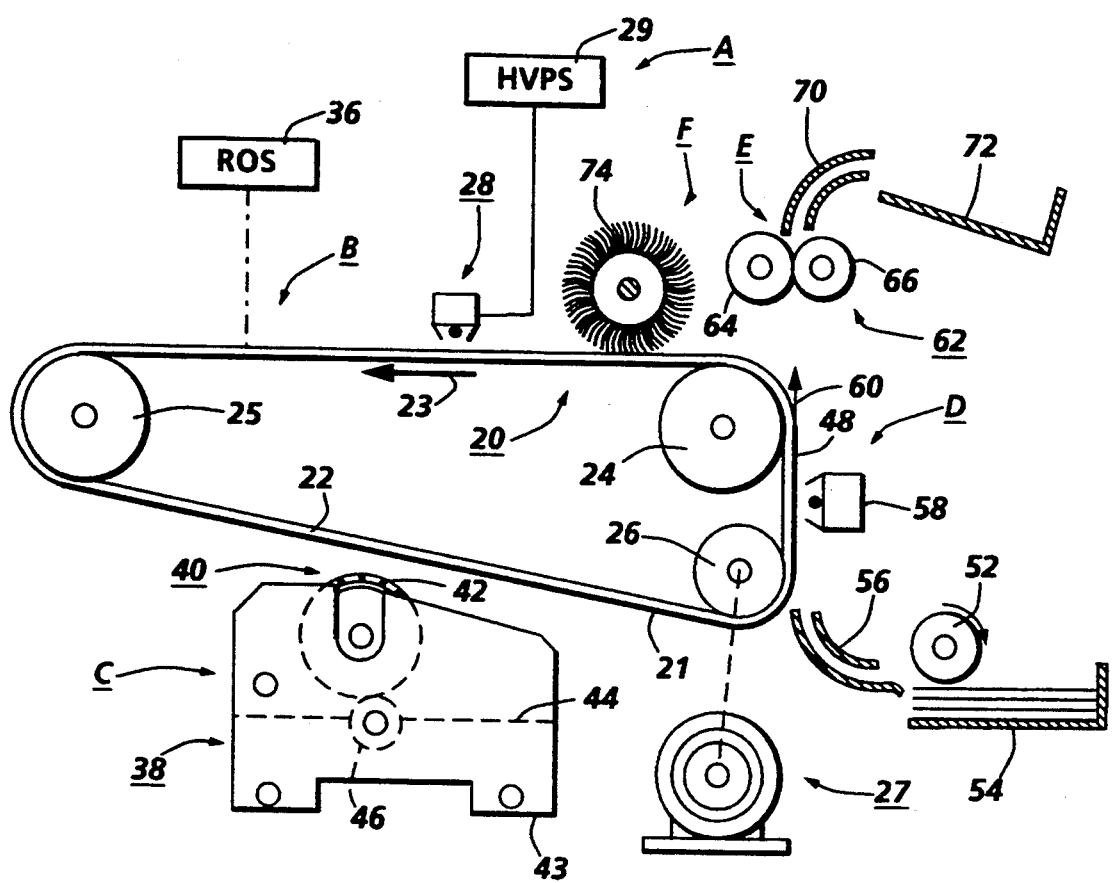
FIG. 2 is a schematic elevational view of an illustrative printing machine incorporating the screen printed donor roll of the present invention therein.

Referring initially to FIG. 2, there is shown an illustrative electrophotographic printing machine incorporating the development apparatus of the present invention therein. The printing machine incorporates a photoreceptor 20 in the form of a belt having a photoconductive surface layer 21 on an electroconductive substrate 22. Preferably the surface 21 is made from a selenium alloy. The substrate 22 is preferably made from an aluminum alloy which is electrically grounded. The belt is driven by means of motor 27 along a path defined by rollers 24, 25 and 26, the direction of movement being counter-clockwise as viewed and as shown by arrow 23. Initially a portion of the belt 20 passes through a charge station A at which a corona generator 28 charges surface 21 to a relatively high, substantially uniform, potential. A high voltage power supply 29 is coupled to device 28.

Next, the charged portion of photoconductive surface 21 is advanced through exposure station B. At exposure station B, ROS 36 lays out the image in a series of horizontal scan lines with each line having a specified number of pixels per inch. The ROS includes a laser having a rotating polygon mirror block associated therewith. The ROS exposes the charged photoconductive surface of the printer.

Figure 3:
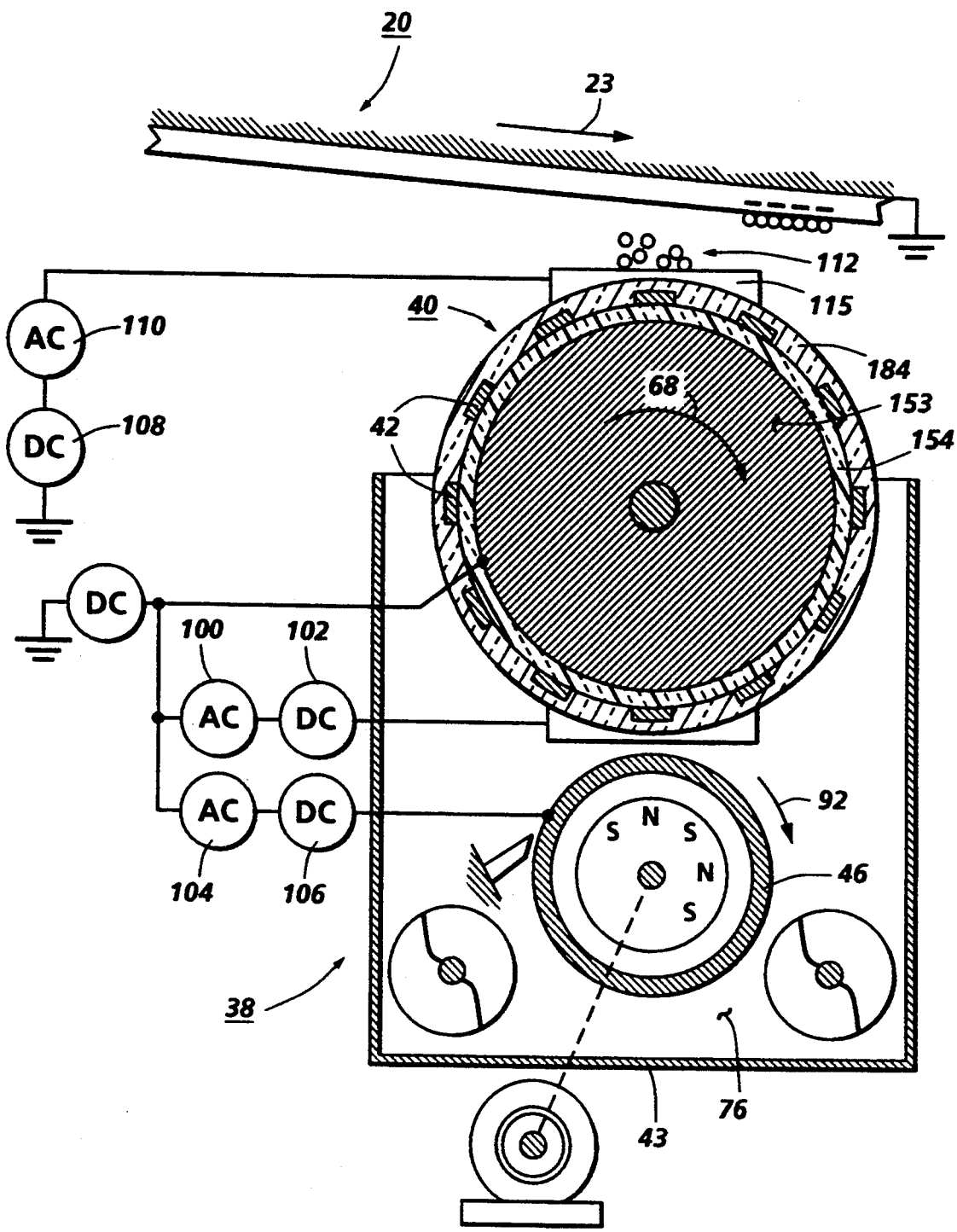
FIG. 3 is a schematic elevational view of development unit incorporating the screen printed donor roll for use in the printing machine of FIG. 2.

After the electrostatic latent image has been recorded on photoconductive surface 21, belt 20 advances the latent image to development station C as shown in FIG. 3. At development station C, a development system 38, develops the latent image recorded on the photoconductive surface. Preferably, development system 38 includes a donor roll or roller 40 and electrode wires 42 positioned in the gap between the donor roll 40 and photoconductive belt 20. Electrodes 42 are electrically biased relative to donor roll 40 to detach toner therefrom so as to form a toner powder cloud in the gap between the donor roll and photoconductive surface.

The latent image attracts toner particles from the toner powder cloud forming a toner powder image thereon. Donor roll 40 is mounted, at least partially, in the chamber of developer housing 43. The chamber in developer housing 43 stores a supply of developer material 44. The developer material is a two component developer material of at least magnetic carrier granules having toner particles adhering triboelectrically thereto. A transport roller 46 disposed interiorly of the chamber of housing 43 conveys the developer material to the donor roller 40. The transport roller 46 is electrically biased relative to the donor roller so that the toner particles are attracted from the transport roller to the donor roller.

Again referring to FIG. 2, after the electrostatic latent image has been developed, belt 20 advances the developed image to transfer station D, at which a copy sheet 54 is advanced by roll 52 and guides 56 into contact with the developed image on belt 20. A corona generator 58 is used to spray ions on to the back of the sheet so as to attract the toner image from belt 20 the sheet. As the belt turns around roller 24, the sheet is stripped therefrom with the toner image thereon.

After transfer, the sheet is advanced by a conveyor (not shown) to fusing station E. Fusing station E includes a heated fuser roller 64 and a back-up roller 66. The sheet passes between fuser roller 64 and back-up roller 66 with the toner powder image contacting fuser roller 64. In this way, the toner powder image is permanently affixed to the sheet. After fusing, the sheet advances through chute 70 to catch tray 72 for subsequent removal from the printing machine by the operator.

After the sheet is separated from photoconductive surface 21 of belt 20, the residual toner particles adhering to photoconductive surface 21 are removed therefrom at cleaning station F by a rotatably mounted fibrous brush 74 in contact with photoconductive surface 21. Subsequent to cleaning, a discharge lamp (not shown) floods photoconductive surface 21 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the development apparatus of the present invention therein.

Referring now to FIG. 3, there is shown developer unit 38 in greater detail. Developer unit 38 includes the housing 43 defining chamber 76 for storing a supply of developer material therein. Donor roll 40 has electrodes 42 in the form of electrical conductors positioned in grooves about the peripheral circumferential surface thereof. The electrical conductors are substantially spaced from one another and insulated from the body of donor roll 40 which is electrically conductive. Donor roll 40 rotates in the direction of arrow 92. The magnetic roller 46 is also mounted in the chamber 76 of developer housing 43. Magnetic roller 46 is shown rotating in the direction of arrow 92. An alternating voltage source 100 and a constant voltage source 102 electrically bias donor roll 40 in the toner loading zone. Magnetic roller 46 is electrically biased by AC voltage source 104 and DC voltage source 106. Normally both of these voltages are set to zero. The relative voltages between donor roll 40 and magnetic roller 46 are selected to provide efficient loading of toner on donor roll 40 from the carrier granules adhering to magnetic roller 46. Furthermore, reloading of developer material on magnetic roller 46 is also enhanced. In the development zone, voltage sources 108 and 110 electrically bias electrical conductors 42 to a DC voltage having an AC voltage superimposed thereon. Voltage sources 108 and 110 are in wiping contact with isolated electrodes 42 in development zone. As donor roll 40 rotates in the direction of arrow 68, successive electrodes 42 advance into development zone 112 and are electrically biased by voltage sources 108 and 110. As shown in FIG. 1, wiping brush 115 contacts isolated electrodes 42 in development zone 112 and is electrically connected to voltage sources 108 and 110. In this way, isolated electrodes or electrical conductors 42 advance into development zone 112 as donor roll 40 rotates in the direction of arrow 68. Isolated electrodes, i.e. electrical conductors 42, in development zone 112, contact wiping brush 115 and are electrically biased by voltage sources 110 and 108. In this way, an AC voltage difference is applied between the isolated electrical conductors and the donor roll detaching toner from the donor roll and forming a toner powder cloud.

Figure 1A:
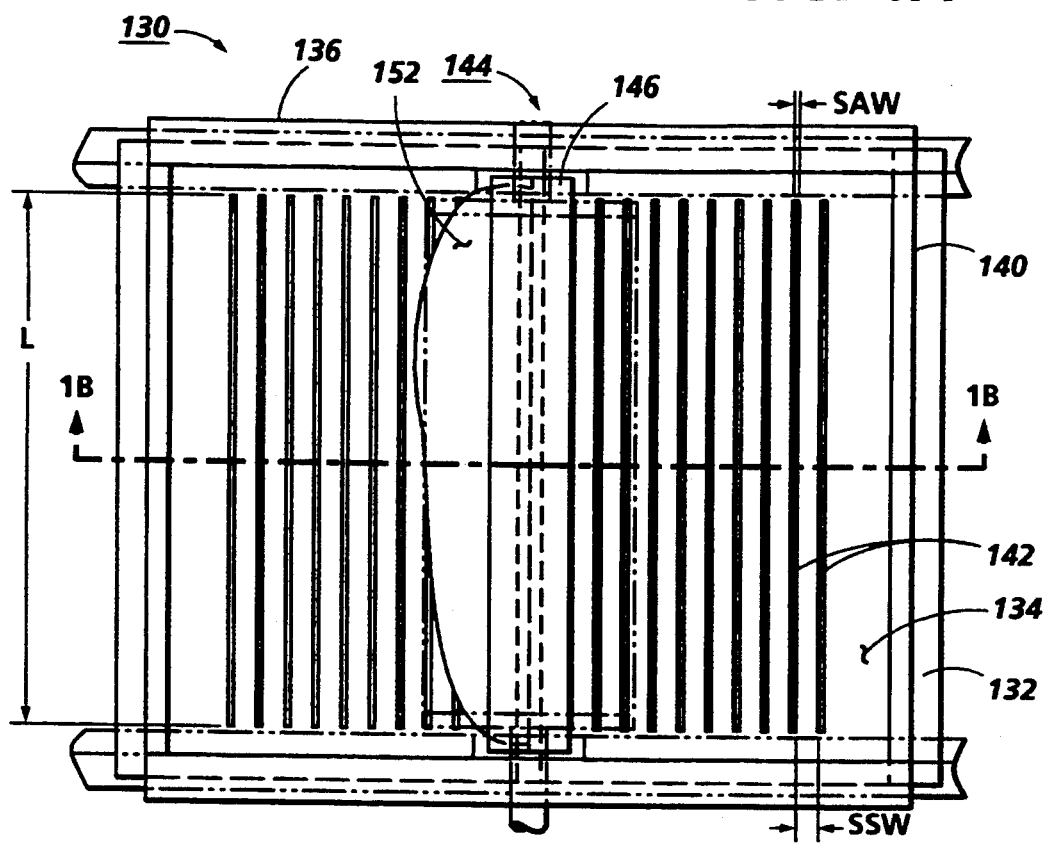
FIG. 1A is a plan view of a screen printing apparatus for manufacturing the screen printed donor roll according to the process of the present invention.
Figure 1B:
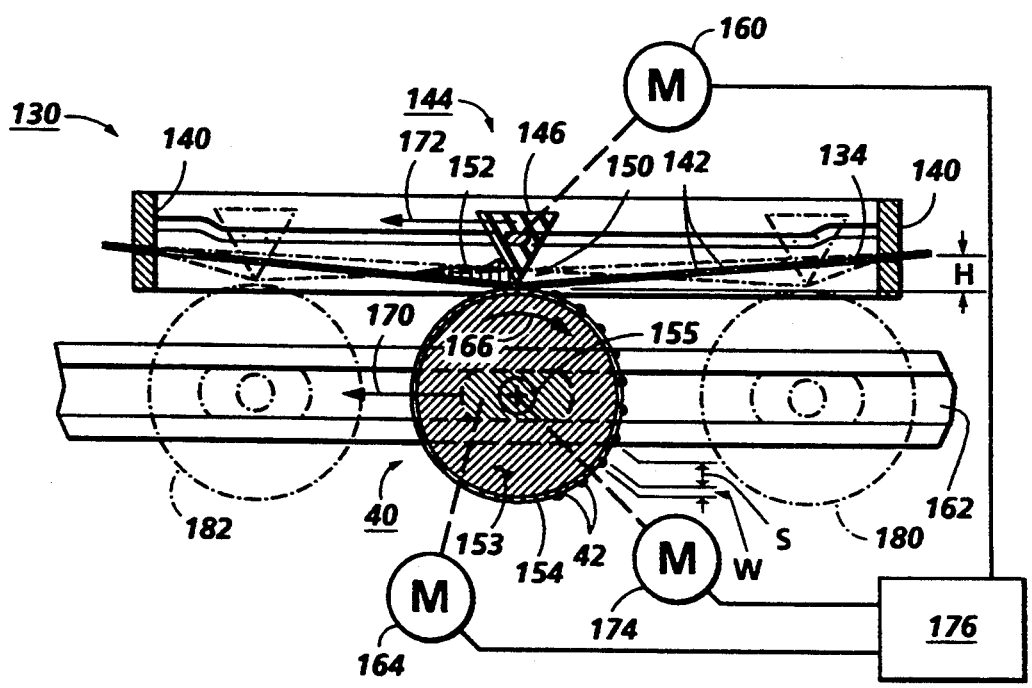
FIG. 1B is a sectional view along the line 1B—1B in the direction of the arrows of the screen printing apparatus of FIG. 1A.

According to the present invention and referring to FIGS. 1A and 1B, a silk screening apparatus 130 is shown for use in manufacturing the donor roll 40. The silk screening apparatus 130 includes a frame 132 about which a screen 134 is tautly secured. The frame 132 typically includes two longitudinal frame members 136 and two transverse frame members 140. The frame is made from a rigid, durable material such as a reinforced plastic or a metal. The screen 134 is made of a flexible material that does not stretch or creep in order that the pattern thereon may be accurately reproduced onto the donor roll 40. Apertures 142 are cut or formed into the screen 134. The apertures 142 form a pattern which corresponds to the pattern upon the donor roll 40.

The apertures 142 preferably consist of equally spaced apart long slender slits having a length L extending in a direction transverse to the screen and having a Screen Aperture Width (SAW) generally equal to the width W of the electrodes 42. The slits 142 are separated from each other by a Screen Spacing Width (SSW) which is roughly equal to space S between the electrodes 42. Preferably, the number of apertures 142 is at least as great as the number of electrodes 42 on the donor roll 40. The width W of the electrodes 42 are typically 50 to 150 microns and the electrodes 42 are approximately 100 microns deep. The space S between adjacent electrodes 42 is about 150 microns.

A carriage 144 is located above the screen 134 and extends in a transverse direction and is supported by the longitudinal members 136 of the frame 132. The carriage 144 includes a squeegee device 146 preferably in the form of a resilient blade. The resilient blade 146 may have any suitable shape but typically has a triangular cross section with a lower edge 150 contactable with the screen 134. Conductive material 152 is placed in the silk screening apparatus 130 between the edge 150 of the resilient blade 146 and the screen 134. The conductive material 152 may be any suitable fluid material which includes a electrically conductive component. For example, the conductive material may be a polymer containing carbon particles or a metal such as ferrite, copper, gold or silver. Such a material 152 may be a silver conductive epoxy or paint. The conductive material may include additives for the proper rheological properties for printing and firing the material. The material 152 should be chosen to provide the electrodes 42 with an electrical conductivity of about $10^{-3}$ ohm-centimeters. The conductive material needs to have a viscosity sufficiently low to permit the conductive material 152 to pass through the apertures 142 of the screen 134 as the screen moves relative to the squeegee device 146. The consistency of a paste has been found to be particularly effective in permitting a uniform flow of the conductive material 152 through the aperture 142 while permitting the conductive material 152 to remain on the donor roll 142 during the silk screening process and during drying and firing.

The donor roll 40 preferably includes a cylindrically shaped core 153 made of an electrically conductive material, such as aluminum. A dielectric undercoating layer 154 is applied onto the core 153. The layer 154 may be an anodized layer formed upon the aluminum core 153. The layer 154 may be a dissimilar material with an overall thickness of from about 20 to about 75 microns and may be applied directly on conductive sleeve 74 by spraying, dipping, powder spraying, fluidized bed or any other suitable technique. The dielectric coating layer 154 may also be inorganic such as various oxide, flame spray coated and ceramics. Typical organic layers may include polyurethanes, polyesters, polytetra fluorethylenes, polycarbonates, poly arylethers, polybutadienes, polysulfones, polyimides, polyamides, phenoxy and pheoxlics. For example, a thin layer of a ceramic, may be coated upon the outer periphery of the cylindrically shaped core 153.

The donor roll 40 in the partially manufactured condition as described in the previous paragraph is placed beneath the screen 134 and is aligned with the donor roll axis 155 parallel with the slits 142. Preferably, the outer periphery of the donor roll 40 is placed a height H below the surface of the screen 134 to provide for a minimum contact between the screen 134 and the donor roll 40 to assure the proper transfer of the conductive material 152 to the donor roll 40.

The silk screening apparatus 130 is so configured to permit the rolling contact of the donor roll 40 against the screen 134 so that the electrodes 42 are formed from the conductive material 152 oozing through the slits 142 with the screen aperture width SAW of the screen 134 being equal in width to the width W of the electrodes 42 on the donor roll 40 and such that the screen spacing width SSW on the screen 134 being equal to the space S between adjacent electrodes 42 on the donor roll 40. It should be appreciated that the width W and the aperture width SAW as well as the spacing width SSW and the space S may differ slightly from each other to account for the dynamics of the silk screening process.

The rolling contact between the donor roll 40 and the screen 134 may be accomplished by numerous alternative mechanical devices and significantly different relative motions between the donor roll 40 and the silk screening apparatus 130 than that shown in FIGS. 1A and 1B. For example, the donor roll 40 may merely rotate and the screen 134 move in the longitudinal direction. In that configuration the resilient blade 146 would remain in a fixed position similarly to the donor roll 40 at a position directly above the donor roll 40.

Alternatively, the donor roll 40 and the screen 134 may move complimentarily in the longitudinal direction. The resilient blade 146 would then need to move in a longitudinal direction identical to the donor roll 40.

Preferably, as shown in FIGS. 1A and 1B, the frame 132 may remain in a fixed position while the donor roll 40 and the resilient blade 146 move together in a longitudinal direction perpendicular to the apertures 142. As shown in FIG. 1B, the carriage 144 moves along channels 156 located in the longitudinal members 136 of the frame 132. The resilient blade 146 moves in the longitudinal direction by a positioning motor 160. The donor roll 40 likewise moves simultaneously in the longitudinal direction within a donor roll channel 162. A positioning motor 164 controls the longitudinal positioning of the donor roll 40. The resilient blade 146 and the donor roll 40 may be guided within the channels 156 and 162, respectively by any suitable mechanism such as a rack and pinion or a timing belt and sprocket, to maintain accurate alignment of the resilient blade 146 and donor roll 40. The donor roll 40 also rotates in the direction of arrow 166 in order to maintain generally rolling contact with the screen 134 as the donor roll 40 moves in the longitudinal direction in the direction of arrow 170. As the resilient blade 146 moves likewise in direction of arrow 172 which is identical to the direction 170 the donor roll 40. The rotational speed of the donor roll 40 is governed by a positioning motor 174, such as a stepping motor in the form of an AC or DC brushless motor. To synchronize the movement of the donor roll 40 with the resilient blade 146 the motors 160, 164 and 174 are controlled by a controller 176.

To apply the electrodes 42 to the donor roll 40, a donor roll is placed in the channel 162 below the screen 134 in the right-hand position 180. The conductive material 172 is then positioned between the edge 150 of the resilient blade 146 and the screen 134. The controller 176 then causes the donor roll 40 to rotate clockwise in the direction of arrow 166 while simultaneously the controller 176 causes positioning motors 160 and 164 to cause the resilient blade 146 and the donor roll 40 to simultaneously move in rolling contact in the respective direction of arrows 172 and 170. During the contact of the resilient blade 146 against the screen 132 the conductive material 172 is urged through the slits 142 onto the periphery of the donor roll 40. When the donor roll 40 arrives at left-hand position 182, conductive material 172 has past through all the slits 142 and correspondingly all the electrodes 42 have been formed upon the donor roll 40. The donor roll 40 may then be removed from the channel 162 and another donor roll positioned into the screening apparatus 130.

After the donor roll 40 has been removed from the silk screening apparatus 130 the conductive material 172 is dried upon the donor roll 40. After the material 172 has dried, it is fired to removed the binders and additives. The firing bonds the particles together and bonds the particles to the substrate.

After the donor roll 40 has been dried and fired, the donor roll 40 is coated with a relaxable overcoat 184 of approximately 12 microns. The overcoat 184 may be made of any material to obtain the proper relaxable properties for example, the overcoat may be made from a carbon black, copper iodine or a fullerene compound. The soluble metal such as, ferric chloride are preferred.

While the donor roll 40 of FIG. 3 may be successfully made on the silk screening apparatus 130 of FIGS. 1A and 1B, the silk screening apparatus 130 is inherently quite expensive and requires considerably maintenance to maintain the required accuracy of the position and dimensions of the electrodes 42 on the donor roll 40.

Figure 7:
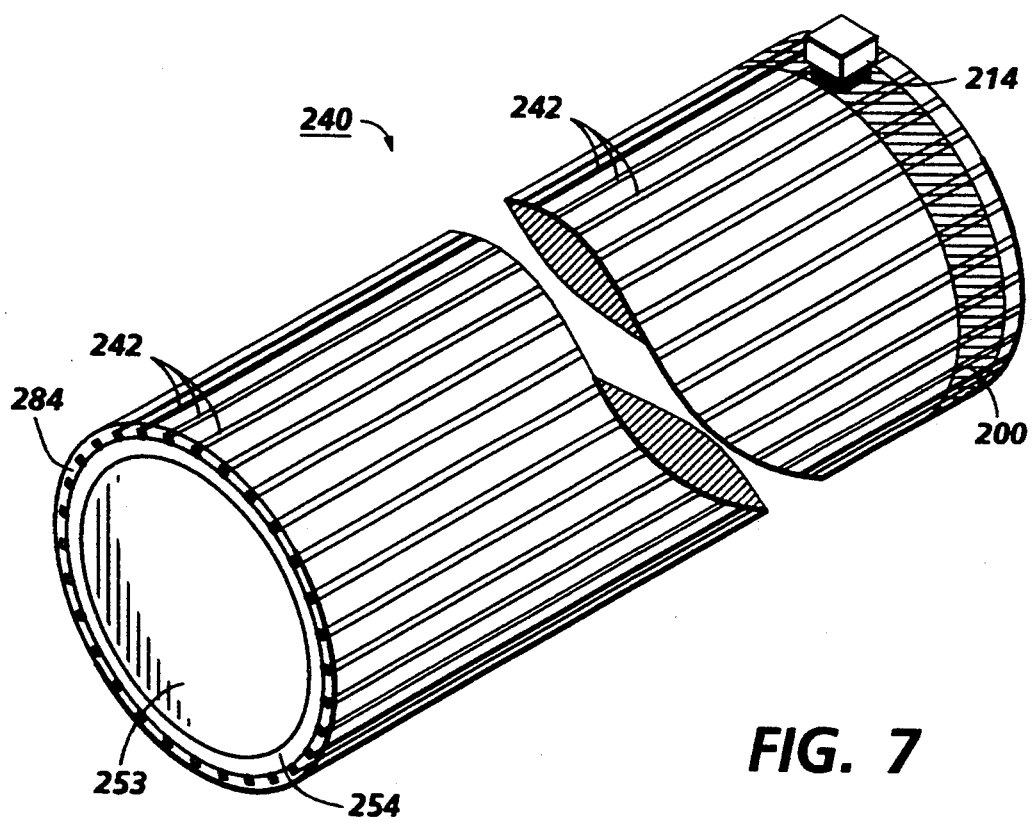
FIG. 7 is a fragmentary perspective view of an interdigitized segmented donor roll of the present invention.

Referring to FIG. 7, an alternate donor roll 240 has been provided to permit the silk screening of the electrodes using a simpler silk screening apparatus. All electrodes 242 on the surface of the donor roll 240 are connectable to a brush 214. Between the electrodes 242 and a conductive core 253 of donor roll 240 a dielectric layer 254 cause all of the electrodes 242 disposed on the surface of donor roll 40 to form a set of capacitors in regard to the core 253.

The portion of the donor roll 240 in contact with the brush 214 is coated with a thin resistive coating 284, so that an added resistance is in the interface between the brush 214 and a given electrode for preventing arcing. In FIG. 7, the resistive coating 284 is shown as a band 200 which corresponds to the path of the brush 214. The coating 284 may alternately extend beyond the band 200.

The dielectric layer 254 is made of a similar material to layer 154 of FIG. 3. However the layer 254 is made of a plate. The electrodes 242 are formed onto the layer 254 when the layer 254 is in the form of a plate. The electrodes may thus be silk screened onto the layer 254 by use of simpler silk screening equipment not requiring the accurate rotation of the donor roll during silk screening as in the process of FIG. 3. The layer 254 is then formed about the conductive core 253 of donor roll 240 and secured thereto. The layer 254 may need to be made of a thickness sufficient to permit its handling during the silk screening process and the subsequent securing of the layer 254 to the core 253.

The electrodes 242 being contacted by the brush 214 at a given moment will be energized and in fact functioning to create a toner cloud.

According to the present invention and referring to FIGS. 4A and 4B, silk screening apparatus 330 for use in manufacturing the donor roll 240 of FIG. 7 is shown. The silk screening apparatus 330 of FIGS. 4A and 4B is similar to the silk screening apparatus 130 of FIGS. 1A and 1B except that the channel 164 of FIG. 1B which is used to contain and rotate the donor roll 40 is replaced by a vacuum chuck 338 which is used to secure the dielectric layer 254 or plate 254 of the donor roll 240 of FIG. 7.

The vacuum chuck 338 includes vacuum lines 339 which are connected to a vacuum source 341. The vacuum lines 339 serve to maintain the plate 254 in a fixed position relative to the vacuum chuck 338.

A squeegee device in the form of a resilient blade 346 moves longitudinally in the direction of arrow 372 along a channel 356. The upper surface of the plate 254 is spaced a height H2 below screen 334. The screen 334 is spaced from the plate 254 in order to prevent the smearing of the electrodes 242 and to prevent the drying of electrodes 242 within slits 342.

To apply the electrodes 242 to the plate 254, conductive material 352 which is identical to conductive material 152 of FIGS. 1A and 1B, is placed between the resilient blade 346 and the screen 334 when the resilient blade 346 is in a first position 380. As the resilient blade 348 moves in the direction of arrow 372 the conductive material 352 is forced through the slits 342 onto the plate 254. The resilient blade 342 is moved in the direction of arrow 372 by any suitable power source, or by hand along the channels 356. For example, a motor 360 may be used to translate the resilient blade 346. When the resilient blade 346 has reached a second position 382 the resilient blade 346 has urged conductive material 352 through all the slits 342 forming all the electrodes 242 into the plate 254. The vacuum source 341 is then de-energized permitting the removal of the plate 254 with the electrodes 242 plated thereon from the vacuum chuck 338. The next plate is then positioned into the vacuum chuck 338 while the previous plate with the electrodes thereon is removed for further processing.

Figure 5:
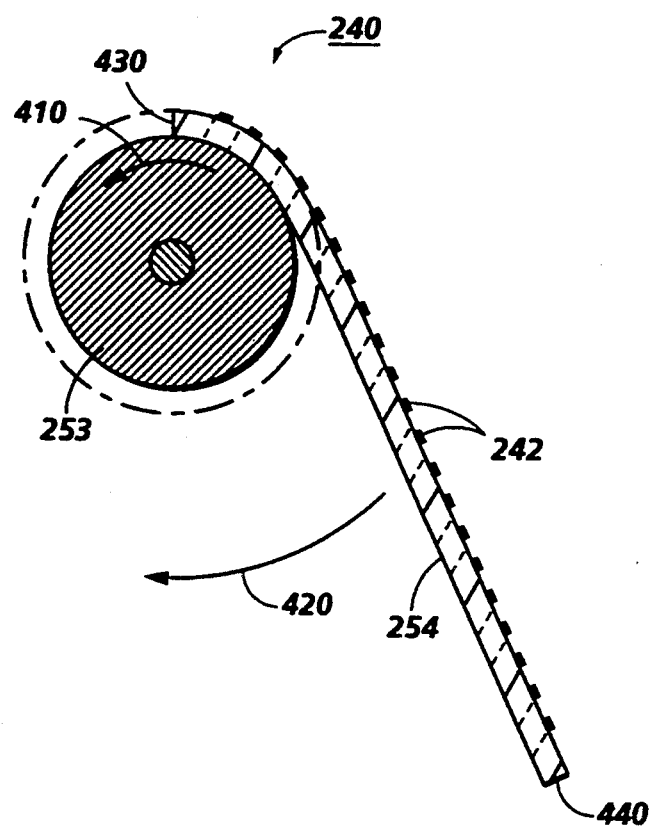
FIG. 5 is an elevational view of another alternate screen printing apparatus for manufacturing the screen printed donor roll of the present invention.

Now referring to FIG. 5, the dielectric substrate in the form of the plate 254 which has been removed from the silk screening apparatus 330 of FIGS. 4A and 4B is being formed around the conductive core 253 to form donor roll 240. While the conductive core 253 is rotated in the direction of arrow 410, the plate 254 is wrapped in the direction of arrow 420 until first edge 430 of the plate 254 becomes proximate to the second face 440 of the plate 254. The plate 254 may be bonded to the conductive core 253 by any suitable means, such as an adhesive. Preferably, the roll 240 is dried and cured to permanently secure the electrodes 242 to the plate 254 and to secure the plate 254 to the core 253.

Figure 6:
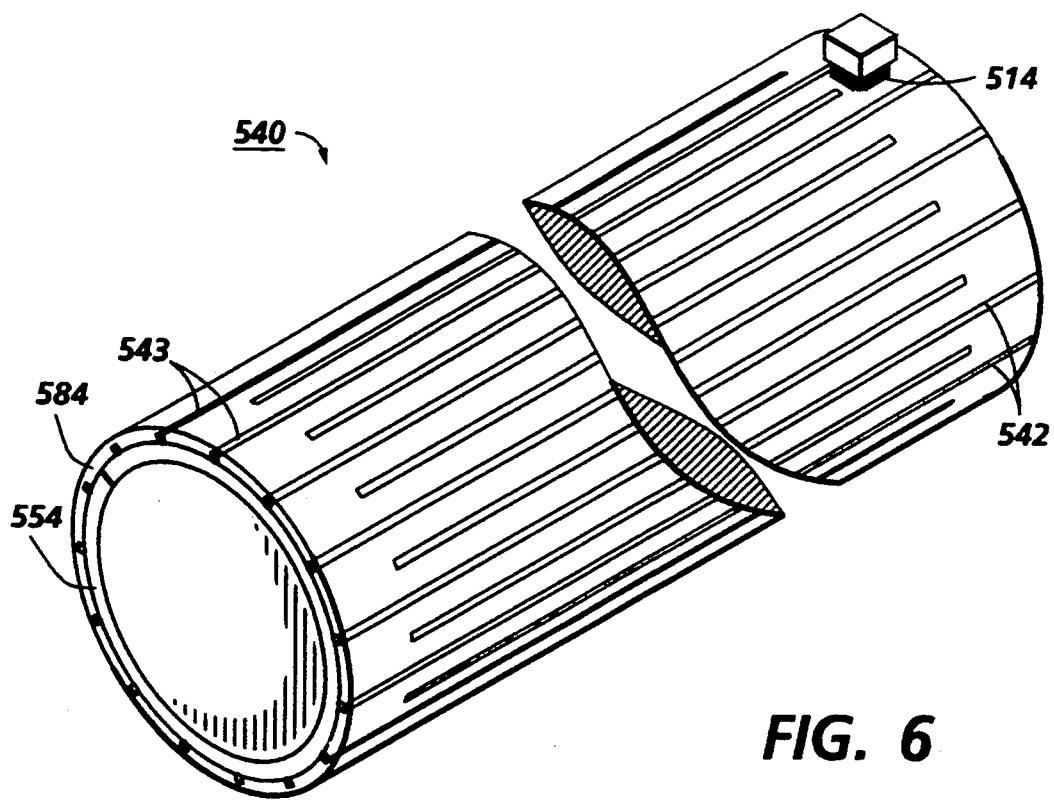
FIG. 6 is a fragmentary perspective view of a segmented donor roll of the present invention.

An alternate design of an electroded donor roll is shown in donor roll 540 of FIG. 6. This design of a donor roll is more fully disclosed in U.S. Pat. No. 5,289,240 to Wayman which is hereby incorporated by reference. A brush 514 is disposed at one end of the donor roll 540, preferably, at a location spaced away from the length of the donor roll 540 corresponding to the imaging area on belt 20 (see FIG. 2). It will be seen in FIG. 6 that the filaments of brush 514 contact electrodes 542 at one end of the donor roll 540; of course, contact by the filaments at this one point will energize the contacted electrodes 542 for the entire length thereof.

A set of passive electrodes shown as 543, are interdigitated with the electrodes 542. Like the electrodes 542, the passive electrodes 543 are disposed longitudinally along the donor roll 540, but, as can be seen in FIG. 6, do not extend to the end of donor roll 540 where they may be contacted by the filaments of brush 514. Instead of being contacted by brush 514, the passive electrodes 543 are connected to a bias source. One possible way of biasing the passive electrodes 543 is to provide some means (not shown) on the donor roll 540 of connecting the passive electrodes 543 to the axis thereof.

The purpose of the passive electrodes 543 interdigitated with electrodes 542 is to, in effect, create a series of abutting capacitors along the circumference of donor roll 540. The alternating electrodes 542 and passive electrodes 543 form a series of back-to-back capacitor plates with spacing therebetween. The electric field associated with these capacitors can thus be used to cause toner particles on the surface of donor roll 540 in the development zone to form the desired powder cloud as the electrodes 542 are energized.

The passive electrodes 543 contact the bias source. The function of the conductive core 74 of the donor roll of FIG. 3 is to contact the bias source. The donor roll 540 therefore does not require a conductive core and may include a hollow dielectric core layer 554 made of a similar material as that of dielectric layer 154 of donor roll 40 of FIG. 1B or dielectric layer 254 of donor roll 240 of FIG. 7.

The donor roll 540 may thus as shown in FIG. 6 include the dielectric hollow core layer 554 onto which the electrodes 542 and 543, similar to electrodes 40 and 240 of FIGS. 3 and 7, respectively, except as noted, are longitudinally and equally spaced. A relax layer 584, similar to relax layers 184 and 284 on the electrodes 40 and 240 of FIGS. 3 and 7, respectively, is located over the electrodes 542 and 543.

The dielectric hollow core layer 554 may be a cylinder as in the layer 154 of FIG. 1B or be a plate as in the layer 254 of FIG. 7. If the layer 554 is in the form of a cylinder (not shown), the electrodes 542 for the donor roll 540 may be manufactured with the silk screening apparatus 130 of FIG. 1A and 1B. If the dielectric hollow core layer is in the form of a plate 554 formed into a cylinder as in FIG. 6, the electrodes 542 for the donor roll 540 may be manufactured with the silk screening apparatus 330 of FIG. 4A and 4B.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method of manufacturing a donor roll having a plurality of electrodes on the surface thereof for use in developing a latent image, comprising:

providing a substantially cylindrical member; covering at least a portion of the surface of the member tangentially with a screen defining an aperture therein;

urging a conductive material through at least a portion of the aperture and onto the surface of the member to form at least one of the electrodes; and advancing the screen and the surface of the member synchronously to form subsequent electrodes.

2. A method according to claim 1, wherein said providing step comprises providing a dielectric member.

3. A method according to claim 1, wherein said providing step comprises providing an electrically conductive member having a dielectric layer thereon.

4. A method according to claim 1, wherein said covering step comprises covering the member with a cylindrical screen having a plurality of spaced apart slits thereon.

5. A method according to claim 4, wherein said covering step comprises the step of covering a portion of the surface of the member with a screen having an interconnecting slit which is substantially transverse to the first mentioned slits.

6. A method according to claim 4, wherein said covering step comprises covering a portion of the surface of the member with a screen having every other slit forming a first group of slits being interconnected by a first interconnecting slit substantially perpendicular the first group of slits and the remaining of the first mentioned slits forming a second group of slits being interconnected by a second interconnecting slit opposite the first interconnecting slit and substantially perpendicular to the second group of slits.

7. A method according to claim 4, wherein said advancing step comprises the steps of synchronously rotating the screen and the member with the screen and the member continuously being in rolling contact with one another.

8. A method according to claim 7, wherein said urging step comprises:

placing a quantity of the conductive material inside the screen; and placing a bar inside the screen and adjacent thereto so that the rotation of the screen urges the material therethrough.

9. A method according to claim 8, wherein said urging step comprises placing a resilient bar having an edge thereof in contact with the screen.

10. A method according to claim 1, further comprising applying a semi-conductive material to the periphery of the member after said advancing step.

* * * * *